United States Patent [19]

Philipoff

[11] 4,030,718
[45] June 21, 1977

[54] UNIVERSALLY ADJUSTABLE VISE STOP

[76] Inventor: Alexandros Philipoff, 135 Castilian Apts., Winter Park, Fla. 32789

[22] Filed: Oct. 8, 1975

[21] Appl. No.: 620,559

Related U.S. Application Data

[63] Continuation-in-part of Ser. No. 452,954, March 20, 1974, abandoned.

[52] U.S. Cl. ............................................. 269/315
[51] Int. Cl.² ........................................ B23Q 3/18
[58] Field of Search .................. 269/291, 297–306, 269/315, 318; 33/169 R, 172 B; 83/467, 468

[56] References Cited
UNITED STATES PATENTS

| | | | |
|---|---|---|---|
| 2,507,288 | 5/1950 | Wagner | 269/303 |
| 2,627,118 | 2/1953 | Young | 33/169 R |
| 2,835,156 | 5/1958 | Eklund | 269/303 |
| 2,965,970 | 12/1960 | Rocheleau | 33/169 R |
| 3,069,778 | 12/1962 | Schiler | 33/169 R |
| 3,188,078 | 6/1965 | Peterson | 269/305 |
| 3,810,311 | 5/1974 | Pingel | 33/169 R |

Primary Examiner—Roy Lake
Assistant Examiner—Neil Abrams
Attorney, Agent, or Firm—Duckworth, Hobby, Orman, Allen & Pettis

[57] ABSTRACT

A work stop for use with work holding means of the type defining a corridor therealong includes a bar fixed at one end to a work-holding means and a stop arm rotatably fixed to the other end of the bar, such that the stop arm extends into the corridor and bears against a work piece held by the work-holding means.

7 Claims, 4 Drawing Figures

U.S. Patent  June 21, 1977  4,030,718
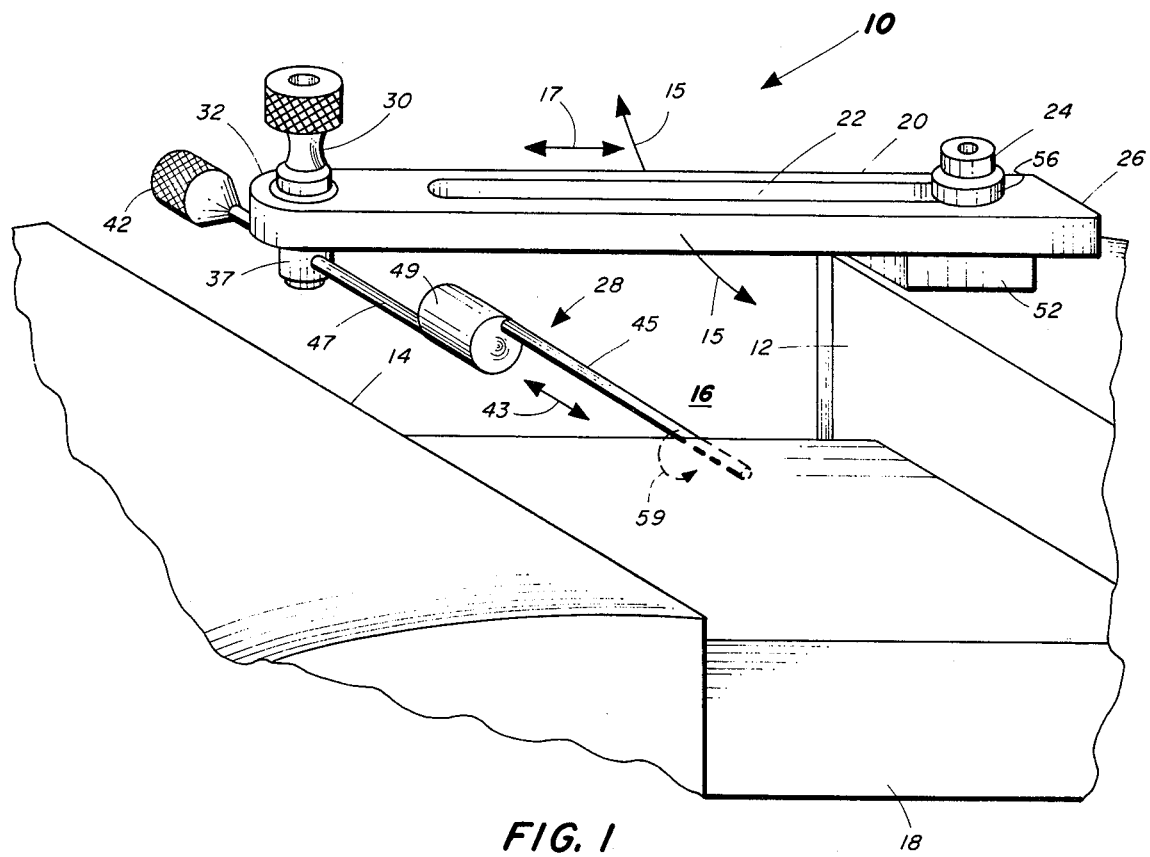
FIG. 1
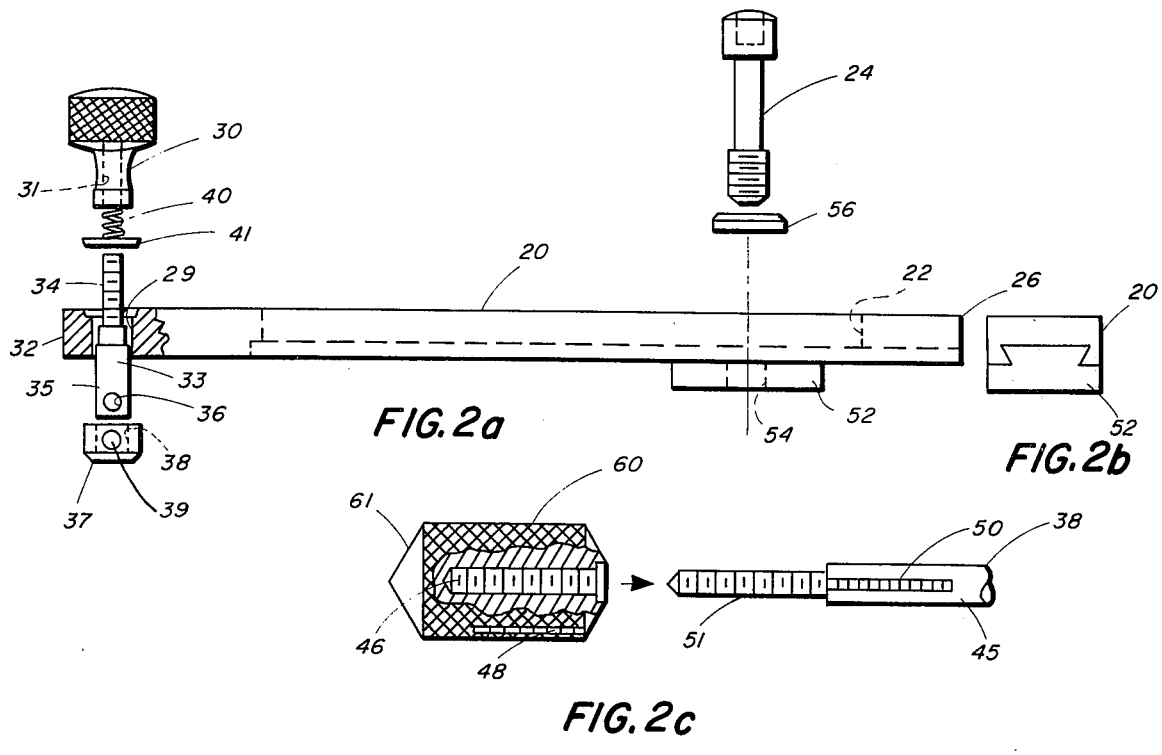
FIG. 2a  FIG. 2b
FIG. 2c

UNIVERSALLY ADJUSTABLE VISE STOP

This application is a continuation-in-part of Application Ser. No. 452,954, filed Mar. 20, 1974 now abandoned.

BACKGROUND OF THE INVENTION

1. Field of the Invention

The present invention relates to machine tools, and in particular, relates to vise stops adapted to insure common positioning of the work in the machine.

2. Description of the Prior Art

In the machinery art, it is frequently necessary to perform repetitious cutting, milling and latheing functions on a large number of work pieces. For such operations, it is desirable to insure that each work piece is positioned in the work holder (i.e. the vise grip) the same with respect to the tool, in order that each work piece will be identically machined.

In milling machines, it is difficult to change work pieces and accurately place subsequent work pieces so that each will have the same relationship with respect to the cutting head as each preceding work piece. The desired relationship may be maintained by measuring the distance from a reference point on the vise grips to a reference point on the first work piece, and thereafter making the same measurement for each following work piece. However, this technique is time consuming.

There have been suggestions in the prior art for employing work piece locating apparatus. For example, Schott, in U.S. Pat. No. 3,171,645, discloses a work piece locating structure for punching machines. In U.S. Pat. No. 1,177,032, Hart discloses a hose clamp vise having adjustment similar to that described above. Zanger, in U.S. Pat. No. 2,914,970, teaches a micro-hole locater, while Wilson teaches a work brace and locater in U.S. Pat. No. 2,623,421.

SUMMARY OF THE INVENTION

The present invention contemplates a work stop for use with work-holding means, i.e. vise grips, of the type defining a corridor therebetween, the stop including a bar fixed at one end to the holding means and a stop arm rotatably fixed to the other end of the bar, the stop bar being adapted to extend into the corridor and bear against the work piece held by the holding means.

In one specific embodiment, both the bar and stop arm are rotatable with respect to each other and the holding means, and means are provided for adjusting the length of both the bar and the stop bar. The stop bar may further include a rotatable extending means fixed at one end, such that a predetermined dimension may be either increased or decreased from the total length of the stop arm for each complete rotation of the extending means.

THE DRAWING

FIG. 1 is a perspective view of an embodiment of apparatus in accordance with the present invention.

FIGS. 2a and b are side and end views, respectively, partially in cross section, of the apparatus shown in FIG. 1.

FIG. 2c is a side view of an alternate form of the invention.

DETAILED DESCRIPTION

An embodiment of a work stop in accordance with the present invention will be hereinafter described with reference to FIGS. 1, 2a, b, and 2c.

The work stop, referred to generally as 10, is adapted for use with milling machines and cutting tools or other apparatus in which a work-holding means in the from of vise jaws 12, 14 are associated. The space between the vise jaws 12, 14 defines a corridor 16. The material to be worked upon by the milling machine, etc., is commonly referred to as the "work" and is identified by the numeral 18; the work is firmly positioned between the vise grips 12, 14 during the milling operation.

The work stop 10 includes a rigid bar 20 having a longitudinal slot 22 extending therealong. The bar 20 is joined at one end 26 to one of the vise grips 12 by a screw 24, or equivalent fastener, which may be loosened to allow adjustment of the amount of extension of the bar 20 into the corridor 16 (note arrow 17), by allowing the screw 24 to slide along the slot 22. Further, loosening of the screw 24 allows the bar 20 to be rotated with respect to the jaw 12 and screw 24 (note arrows 15).

A stop arm, referred to generally as 28, is rotatably fixed to the other end 32 of the bar 20, and is adapted to extend into the corridor 16 and bear against the work 18 held by the vise grips 12, 14. While the stop arm 28 may be fixed to the end 32 by a variety of techniques, it is preferred to employ a spring-loaded holding screw arrangement which is shown in FIG. 2a and described next.

Noting FIG. 2a, the holding screw arrangement cooperates with a tapped hole 29 extending through the other end 32 of the bar and includes a knurled nut 30 having a threaded hole 31 therein. A holding screw 33 is provided, and includes a threaded shaft 34 extending through the hole 29 of bar 20 and into the threaded hole 31 of the nut 30. The holding screw 33 also includes a neck 35 extending outward from the bar 20 on a side opposing the nut 30. The neck 35 includes a hole 36 therethrough which is transverse to the holes 29 and 31. A collar 37, having a first hole 38 (shown by dotted lines) axial with the neck 35 of the holding screw 33 and a second hold 39 transverse to the hole 38, is also provided. A spring 40 and washer 41 are fitted over the threaded shaft 34 of the holding screw 33. In use, the nut 30 is screwed onto the shaft 34, with the spring 40 and washer 41 therebetween. The collar 37 is fitted over the neck 35, and the two holes 36, 38 are aligned. One end of the stop arm 28 is then extending through the holes 36, 39 and the nut 30 is tightened, causing the neck 35 and collar 37 to tightly engage the arm 28. In this manner, lengthwise adjustment of the stop arm 28 may be made by thereafter loosening the holding screw 30, adjusting the stop arm 28 to the desired length, and then tightening the screw 30, as noted by the arrow 43 in FIG. 2a. It will also be understood that the arm 28 may be pivoted about the end 32 by loosening the nut 30.

Details of the manner in which the screw 24 holds the first end 26 are also shown in FIG. 2a, with further reference to FIG. 2b. Noting FIGS. 1 and 2a, a block 52 preferably of metal, is positioned between the bar 20 and the jaw 12. The block is provided with a threaded hole 54 transverse to the slot 22 and adapted to receive the screw 24. It will be understood that, while not shown, the jaw also requires a threaded hole to receive the screw 24. A washer 56, having an outer diameter greater than the width of the slot 22, fits over the screw 24. Noting FIG. 2b, the block 52 and the bar 20 may be joined by known dovetialing techniques.

In this embodiment, means are also included for providing minor vertical adjustments to the position of the stop arm 28. In this arrangement, the stop arm 28 comprises two portions 45 and 47, each of approximately the same length, and each of which extends into the periphery of an end of a cylindrical block 49 (note FIG. 1). One of the portions 47 extends through the holes 36, 38 and has a knurled knob 42 on the end thereof. Minor vertical adjustments may be made by loosening the nut 30 and rotating the knob 42, causing rotation of the arm portion 45 as shown by the arrow 59.

In accordance with another embodiment of the present invention, the work stop 10 further includes rotatable extending means fixed to the end of the stop arm portion 45. As shown in FIG. 2c, the rotatable extending means comprises a knurled cylinder 60 having a tapered end 61 and a threaded bore 46. In this embodiment, the end 51 of the arm portion 45 is threaded, and adapted to extend into the bore 46. In use, the threaded end 51 and the threaded bore 46 are machined precisely so that a specific dimension is traveled for each complete rotation of the cylinder 60; for example, the threads may be dimensioned so that four microns of travel occurs for each complete rotation of the cylinder 60. The cylinder 60 and the stop arm portion 45 may be provided with respective markers 48, 50, to facilitate the determination of when a complete revolution of the knurled cylinder 60 has taken place.

While the component parts of the work stop 10 may be fabricated from a variety of materials, preferably these components are precisely machined from a non-corrosive metal, for example stainless steel. Other modifications and changes will be evident from the above description to those skilled in the machinery art.

I claim:

1. A work stop for use with work holding means of the type having a pair of opposing jaws defining a corridor therebetween, said jaws being movable one with respect to the other to hold a work piece in said corridor said work stop comprising:
   a bar fixed at one end thereof to the periphery of one of said jaws;
   means for changing the dimension of said bar into said corridor;
   means for rotating said bar with respect to said one jaw;
   a stop arm pivotably mounted on the other end of said bar and spaced from said one jaw, said stop arm adapted to extend through said corridor and bear against said work piece held between said jaws;
   means operable independent of movement of said bar for changing the length of said arm in said corridor;
   said bar including a first hole in said another end;
   a holding screw extending through said first hole and having a second hole transverse to said first hole;
   a collar surrounding a portion of said holding screw out of said first hole, said collar having a third hole axially aligned with said second hole;
   a nut engaging said holding screw on a side of said bar opposite said collar; and wherein
   said arm extends through said second and third holes and is locked therein by rotation of said nut.

2. The work stop recited in claim 1 further comprising means for locking said bar with respect to said work-holding means.

3. The work stop recited in claim 2 wherein said bar locking means comprises:
   said bar including a longitudinal slot therein; and
   a screw extending transversely through said slot and into said work-holding means.

4. The work stop recited in claim 2 further comprising means for vertically adjusting the position of said stop arm.

5. The work stop recited in claim 4 wherein said vertically adjusting means comprises:
   a cylindrical adjusting block;
   said stop arm including at least two portions, one end of the first portion extending into said another end of said bar, and the other end of said first bar rotatably fitted with the periphery of one end of said adjusting block;
   one end of the second of said two portions extending into the periphery of the other end of said block and spaced from said other end of said first portion whereby rotation of said first portion causes a change in the vertical position of said second portion.

6. The work stop recited in claim 1 further comprising rotatable extending means fixed to one end of said stop arm.

7. The work stop recited in claim 6 further comprising means defining a predetermined extending dimension for each complete rotation of said rotatable extending means.

* * * * *